3,423,508
METHOD OF COMBATTING HERPES VIRUS WITH 5-NITROURACIL
Yelahanka Krishnamurthy Srinivas Murthy, Milan, Italy, and Emilio Testa, Tessin, Switzerland, assignors to Lepetit S.p.A., Milan, Italy
No Drawing. Filed July 20, 1964, Ser. No. 383,969
Claims priority, application Great Britain, Aug. 15, 1963, 32,326/63
U.S. Cl. 424—251　　　　　　　　　　1 Claim
Int. Cl. A61k 27/00

---

ABSTRACT OF THE DISCLOSURE 5-nitrouracil has been found effective in combatting viral diseases, such as herpes zoster, when employed topically, orally and parenterally.

---

This invention relates to new pharmaceutical compositions for combatting viral infections.

According to the present invention, it has been found that 5-nitrouracil of the formula

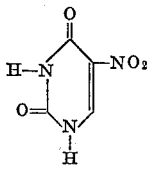

possesses exceptionally high antiviral activity.

5-nitrouracil is a known compound and can be prepared through synthetic ways described in the literature. One very simple process for the preparation of 5-nitrouracil consists in subjecting uracil to the action of nitric acid, as described by Johnson and Matsuo in the Journal of the American Chemical Society 41, page 784 (1914). Obvious modifications of this process can be made in order to improve yield without surpassing the ordinary skill of an instructed organic chemist.

5-nitrouracil shows high activity in vitro against the vaccinia virus at a very low concentration. Although the minimum amount required for a complete inhibition of citopathic effect by vaccinia virus is 15 mcg./ml., the activity is still present even at a concentration as low as 2 mcg./ml.

The pharmacological usefulness of 5-nitrouracil is enhanced by its extremely low toxicity. For instance, it lacks any cytotoxic activity at dilutions of 8,000 mcg./ml. and more, when tested against human embryo epithelial cells grown in vitro. The acute toxicity in mice was determined. the $LD_{50}$ was 1950 mg./kg. (C. L. 1625–2340) by parenteral injection of a 10 percent suspension in gum arabic. By oral route the $LD_{50}$ was 3250 mg./kg. (C. L. 2579–4095). The chronic toxicity is also very low. Doses of 100 mg./kg. daily were given intraperitoneally to mice for a period of two months, without noting any undesirable effect.

5-nitrouracil is fairly soluble in water, which fact renders it still more useful in therapy. One hundred milliliters of distilled water dissolve about 0.5 g. at 28–30° C. Still higher concentration may be reached by adding a solubilizing agent or a substance which forms salts with it, such as an alkali metal hydroxide or an organic base, f.i. mono-, di- and tri-(β-hydroxyethyl)-amine, taking care that the pH of the obtained solution does not exceed about 8.

Tests in rabbits and dogs showed that 5-nitrouracil is well absorbed by the gastro-enteric tract and is eliminated in active form through the urine. In blood it is also present in therapeutically useful concentrations after oral administration.

5-nitrouracil may be administered topically in dermatologic diseases of viral origin. For instance, it may be used as an aqueous solution containing the usual ingredients of these preparations, such as one or more buffering agents, a preservative, a solubilizing agent or a substance with basic reaction to form a salt. Alternatively, 5-nitrouracil may be incorporated into common ointment ingredients, such as Vaseline, lanolin and so on. When the internal route is preferred, a tablet may be prepared using the usual solid diluents and lubricants, such as starch, magnesium stearate, talc etc., or it may be administered as a syrup or as an elixir. In other cases, it may be useful to administer 5-nitrouracil by injection; the solutions are then prepared by the technique used for the aqueous solutions as above stated. While the number of administrations in a day largely depends upon the selected unit dosage, it has been established that daily doses of up to 10 g. are still safe, although much lower dosages are usually sufficient to the scope. The oral and parenteral compositions may be prepared in such a way that any unit dosage contains from 0.01 to 1.0 g. of active substance, and administration will be more or less frequent according to the severity of the treated disease.

A clinical experiment carried out on 26 patients suffering from various kinds of herpes gave exceptionally good results by the topical application of an aqueous 0.35 percent solution 8–10 times daily. The following table summarizes the treated cases giving the duration of therapy, after which a practically complete healing was obtained. The negative results are also indicated.

| Case No. | Disease | Days of therapy |
|---|---|---|
| 1 | Herpes zoster of left buttock | 10 |
| 2 | Necrotic herpes of left parieto-occipital region | 8 |
| 3 | Lumbar herpes zoster with diffused erythema | (¹) |
| 4 | Intercostal herpes zoster | 4 |
| 5 | Zoster involving the braches of left trigeminus n. | 10 |
| 6 | Right intercostal herpes zoster | 3 |
| 7 | Intercostal herpes zoster in 4 years child | 6 |
| 8 | Right lumbar and abdominal herpes zoster. Simplex herpes of the right zygomatic region. | 8 |
| 9 | Brachial herpes zoster in patient suffering from malignant lymphogranuloma. | 3 |
| 10 | Herpes zoster in patient suffering from malignant lymphogranuloma. | 2 |
| 11 | Herpes zoster of right cheek | 2 |
| 12 | Herpes zoster | 1 |
| 13 | Intercostal herpes zoster | 10 |
| 14 | Herpes simplex | 8 |
| 15 | Herpes labialis | (²) |
| 16 | do | 3 |
| 17 | Diffused herpes labialis | 1 |
| 18 | Herpes zoster of left arm | 4 |
| 19 | Herpes simplex of left gluteal region | 2 |
| 20 | Relapsing labial herpes | 1 |
| 21 | Relapsing herpes diffused on upper lip | 1 |
| 22 | Relapsing herpes of lower lip | (³) |
| 23 | Herpes of upper lip | 1 |
| 24 | Herpes labialis with multiple vesicles | 2 |
| 25 | Herpes labialis | (²) |
| 26 | Acute primitive herpetic stomatitis | 1 |

¹ Negative after 15 days.
² Negative afte 4 days.
³ Negative.

The following examples give typical compositions containing 5-nitrouracil as the active ingredient.

EXAMPLE 1

A solution for topical use prepared from—

| | G. |
|---|---|
| 5-nitrouracil | 0.35 |
| Methyl p-hydroxybenzoate | 0.1 |
| $Na_2HPO_4 \cdot 12H_2O$ | 1.986 |
| $KH_2PO_4$ | 0.1885 |
| Phenol red | 0.00008 |
| KOH (q.s. to pH 7.4) | About 0.14 |
| $H_2O$ dist. q.s. to 100 ml. | |

Methyl p-hydroxybenzoate is dissolved in 45 ml. of hot water. The solution is cooled and 5-nitrouracil is suspended therein. Potassium hydroxide is added to pH 7.4.

A buffer is independently prepared by dissolving the phosphates in 45 ml. of water, to which the phenol red is added.

The two solutions are mixed and the volume adjusted to 10 litres by the addition of distilled water. The solution is filtered through a sterile filter Seitz EKS and filled into flasks of 10 ml. volume.

EXAMPLE 2

A tablet for oral therapy is prepared from—

|  | G. |
|---|---|
| 5-nitrouracil | 0.05 |
| Gelatin | 0.01 |
| Cornstarch | 0.05 |
| Talc | 0.025 |
| Mg stearate | 0.015 |

The ingredients are thoroughly admixed and tabletted.

EXAMPLE 3

An injectable solution for ampoules is prepared from—

| 5-nitrouracil | g | 0.01 |
|---|---|---|
| Sterile distilled water | ml | 5.0 |

A sterile aqueous 10 percent solution of sodium hydroxide is added to pH 7.5, then the solution is diluted to a volume of 10 ml. with sterile distilled water and filled into the ampoule, which is sealed.

We claim:

1. A method for combatting herpes virus infections in humans, which comprises repeatedly administering topically to humans infected with herpes virus a water solution containing 0.35% of 5-nitrouracil.

References Cited

Chemical Abstracts, vol. 54, entry 4611a, 1960, citing Gut et al., Collection Czechoslov. Chem. Communs. 24, 3154–62 (1959).

Kaufman et al.: Arch. Ophthal., vol. 67, p. 383, March 1962.

RICHARD L. HUFF, *Primary Examiner.*